US012697571B2

(12) United States Patent
Gurram et al.

(10) Patent No.: US 12,697,571 B2
(45) Date of Patent: Aug. 4, 2026

(54) FLUID SEPARATOR HAVING FLUID RECIRCULATION PASSAGE AND PLURAL OUTLET PASSAGES

(71) Applicant: Garrett Transportation I Inc., Torrance, CA (US)

(72) Inventors: Ranga Chaitanya Gurram, Bengaluru (IN); Akhil Gabriel, Pune (IN)

(73) Assignee: Garrett Transportation I Inc., Torrance, CA (US)

( * ) Notice: Subject to any disclaimer, the term of this patent is extended or adjusted under 35 U.S.C. 154(b) by 315 days.

(21) Appl. No.: 18/618,510

(22) Filed: Mar. 27, 2024

(65) Prior Publication Data

US 2025/0256230 A1 Aug. 14, 2025

(30) Foreign Application Priority Data

Feb. 13, 2024 (IN) .............................. 202411009872

(51) Int. Cl.
B01D 45/16 (2006.01)
B04C 3/06 (2006.01)
(52) U.S. Cl.
CPC ............... B01D 45/16 (2013.01); B04C 3/06 (2013.01)
(58) Field of Classification Search
CPC ........ B04C 2003/003; B04C 2003/006; B04C 7/00; B04C 3/06; B01D 45/16; B01D 45/08
See application file for complete search history.

(56) References Cited

U.S. PATENT DOCUMENTS

| | | | | | |
|---|---|---|---|---|---|
| 2,708,033 | A | * | 5/1955 | Thomas | B07B 7/08 209/139.1 |
| 3,517,821 | A | * | 6/1970 | Keller | B04C 3/06 210/512.1 |
| 3,747,309 | A | * | 7/1973 | Meier | B01D 45/08 55/440 |
| 4,008,059 | A | * | 2/1977 | Monson | B01D 45/14 55/448 |
| 4,162,906 | A | * | 7/1979 | Sullivan | B04C 3/00 210/512.1 |

(Continued)

FOREIGN PATENT DOCUMENTS

| | | |
|---|---|---|
| CA | 2536773 A1 | 3/2005 |
| CA | 2513208 A1 | 1/2006 |

(Continued)

*Primary Examiner* — Hung Q Nguyen
(74) *Attorney, Agent, or Firm* — BelayIP

(57) ABSTRACT

A fluid separator device includes an outer wall member defining an interior, an inlet end with an inlet, and an outlet end with a first outlet and a second outlet. Additionally, the fluid separator includes a fluid flow path system defined within the interior. The fluid flow path system includes a first flow path extending in a first downstream direction from the inlet and through an inner flow member toward at least one of the first and second outlet. The fluid flow path system further includes a second flow path that is at least partly defined between the outer wall member and the inner flow member. The second flow path extends in a second downstream direction from the outlet end toward the inlet end, the second flow path configured to receive flow from the first flow path.

20 Claims, 6 Drawing Sheets

(56)  References Cited

U.S. PATENT DOCUMENTS

| | | | | | |
|---|---|---|---|---|---|
| 4,255,174 | A | * | 3/1981 | Simpson | F02C 7/052 |
| | | | | | 55/306 |
| 4,342,576 | A | * | 8/1982 | Seki | F27B 7/2033 |
| | | | | | 55/459.1 |
| 5,122,171 | A | * | 6/1992 | Kalen | B04C 5/28 |
| | | | | | 55/346 |
| 8,875,535 | B2 | | 11/2014 | Peacos et al. | |

FOREIGN PATENT DOCUMENTS

| | | | |
|---|---|---|---|
| EP | 3272404 | A1 | 1/2018 |
| WO | 2022200047 | A1 | 9/2022 |

* cited by examiner

FLUID SEPARATOR HAVING FLUID RECIRCULATION PASSAGE AND PLURAL OUTLET PASSAGES

CROSS REFERENCE TO RELATED APPLICATION

The present application claims benefit of prior filed India Provisional Patent Application No. 20241009872, filed Feb. 13, 2024, which is hereby incorporated by reference herein in its entirety.

TECHNICAL FIELD

The technical field generally relates to a fluid separator and, more particularly, relates to a fluid separator having a fluid recirculation passage and plural outlet passages.

BACKGROUND

It is known to provide a fluid separator in some fluid systems. During operation, the separator may receive a fluid that contains multiple components, and the separator may affect flow of one component relative to the flow of the other, thereby providing some degree of separation of the components.

In some systems, for example, a turbine stage (i.e., expander) of a turbomachine may receive an exhaust stream containing air, water vapor, and liquid droplets. The liquid droplets may negatively affect operations of the turbine stage, may decrease operating efficiency, may cause premature wear, or cause other problems. Thus, it may be preferable to provide the system with a device that removes the liquid droplets before they enter the turbine stage.

However, existing fluid separating devices suffer from certain deficiencies. They may not effectively separate the components in some operating conditions. In some cases, the fluid separating device may disrupt flow to the downstream device (e.g., a turbine/expander stage of a turbomachine). Fluid separating devices may also be difficult or otherwise inefficient to manufacture. Furthermore, some fluid separating devices may be bulky, heavy, and/or contain a large number of parts, which may be detrimental to the larger system.

Accordingly, it is desirable to provide a fluid separator that effectively separates one component of a fluid stream from others (e.g., separating liquid water droplets from an exhaust stream) across a wide range of operating conditions without significantly affecting flow to the downstream device. It is also desirable to provide a fluid separator that may be manufactured efficiently. Also, it is desirable to provide a fluid separator that is relatively lightweight, compact, and/or manufactured with a relatively small number of parts. Other desirable features and characteristics will become apparent from the subsequent detailed description and the appended claims, taken in conjunction with the accompanying drawings and this background.

BRIEF SUMMARY

A fluid separator device is disclosed that is configured for separating a part of a fluid mixture from another part of the fluid mixture. The fluid separator device includes an outer wall member that defines an interior of the fluid separator device. The interior defines a longitudinal axis of the fluid separator device. The separator device includes an inlet end that defines a fluid inlet that is fluidly connected to the interior and that is configured to receive the fluid mixture. The separator device also includes an outlet end separated at a distance from the inlet end along the longitudinal axis. The outlet end defines a first fluid outlet from the interior. The longitudinal axis extends through the first fluid outlet. Moreover, the separator device includes an outlet pipe that is supported within the interior and within the first fluid outlet. The outlet pipe defines a second fluid outlet from the interior. Also, the separator device includes an inner flow member that is supported within the interior. Additionally, the fluid separator includes a fluid flow path system defined within the interior. The fluid flow path system includes a first flow path extending in a first downstream direction from the fluid inlet and through the inner flow member toward at least one of the first fluid outlet and the second fluid outlet. The fluid flow path system further includes a second flow path that is at least partly defined between the outer wall member and the inner flow member. The second flow path extends in a second downstream direction from the outlet end toward the inlet end. The second flow path is configured to receive flow from the first flow path.

In another example embodiment, a method of manufacturing a fluid separator device that is configured for separating a part of a fluid mixture from another part of the fluid mixture is disclosed. The method includes providing an outer wall member that defines an interior of the fluid separator device. The interior defines a longitudinal axis of the fluid separator device. The method further includes providing an inlet end that defines a fluid inlet that is fluidly connected to the interior and that is configured to receive the fluid mixture. Also, the method includes providing an outlet end separated at a distance from the inlet end along the longitudinal axis. The outlet end defines a first fluid outlet from the interior. The longitudinal axis extends through the first fluid outlet. Also, the method includes supporting an outlet pipe within the interior and within the first fluid outlet. The outlet pipe defines a second fluid outlet from the interior. The method further includes supporting an inner flow member within the interior. Also, the method includes defining a fluid flow path system within the interior. The fluid flow path system includes a first flow path in a first downstream direction from the fluid inlet and through the inner flow member toward at least one of the first fluid outlet and the second fluid outlet. The fluid flow path system also includes a second flow path that is at least partly defined between the outer wall member and the inner flow member. The second flow path extends in a second downstream direction from the outlet end toward the inlet. The second flow path is configured to receive flow from the first flow path.

In an additional embodiment, a fuel cell system is disclosed that includes a fuel cell stack, a turbomachine with a turbine section, and a fluid separator device fluidly connected to the fuel cell stack and configured to receive a fluid mixture from the fuel cell stack. The fluid separator device is fluidly connected upstream to the turbine section. The fluid separator device is configured for separating a part of the fluid mixture from another part of the fluid mixture to provide a separated exhaust stream from the fuel cell stack to the turbine section. The fluid separator device includes an outer wall member that defines an interior of the fluid separator device. The interior defines a longitudinal axis of the fluid separator device. The fluid separator device includes an inlet end that defines a fluid inlet that is fluidly connected to the interior and that is configured to receive the fluid mixture. Additionally, the fluid separator device includes an outlet end separated at a distance from the inlet end along the longitudinal axis. The outlet end defines a first fluid outlet from the interior. The longitudinal axis extends through the first fluid outlet. Also, the fluid separator device includes an outlet pipe that is supported within the interior and within the first fluid outlet. The outlet pipe defines a second fluid outlet from the interior. The fluid separator device includes an inner flow member that is supported within the interior. Moreover, the fluid separator device includes a fluid flow path system defined within the interior. The fluid flow path system includes a first flow path extending in a first downstream direction from the fluid inlet and through the inner flow member toward at least one of the first fluid outlet and the second fluid outlet. Also, the fluid flow path system includes a second flow path that is at least partly defined between the outer wall member and the inner flow member. The second flow path in a second downstream direction from the outlet end toward the inlet end. The second flow path is configured to receive flow from the first flow path.

BRIEF DESCRIPTION OF DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Broadly, example embodiments disclosed herein include a fluid separator for separating one part of a fluid mixture (e.g., liquid water droplets) from another (e.g., water vapor/air). The fluid separator of the present disclosure may include an inlet end with an inlet and an outlet end with a plurality of outlets. The inlet end and the outlet end may be separated along a longitudinal axis. The fluid separator may also include a first flow path that extends along the longitudinal axis. Furthermore, the fluid separator may include a second flow path. Fluid entering the first flow path may flow partly along the first flow path from the inlet to the outlet(s). Liquid water droplets may flow within air and branch from the first flow path and into the second flow path to be drained therefrom, and the air in the second flow path may recirculate back into the first flow path. The fluid separator may also include a swirl member within the first flow path that swirls the fluid within the first flow path, for example, to direct liquid water droplets toward the second flow path. Furthermore, at least one of the outlets may be configured to define a low pressure area for outletting water vapor from the separator.

Figure 1:
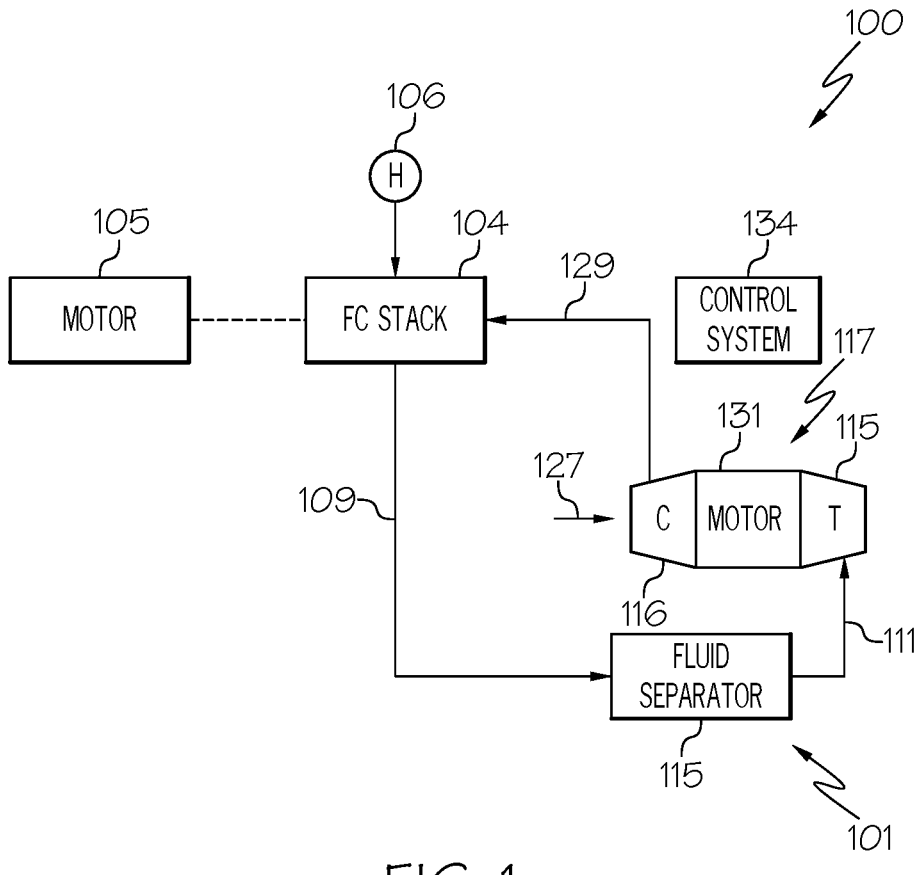
FIG. 1 is a schematic view of a fuel cell system, which includes a fluid separator device according to example embodiments of the present disclosure.

FIG. 1 is a schematic view of a fuel cell system 100 that includes a fluid separator 101 (i.e., de-mister, fluid separating device, etc.) that may be configured according to embodiments of the present disclosure. The fluid separator 101 may be fluidly connected to a fuel cell stack 104 of the fuel cell system 100. The fluid separator 101 may receive an exhaust stream 109 from the fuel cell stack 104 during operation. The fluid separator 101 may be operable/configured to separate out liquid fluid droplets (e.g., water droplets) from the exhaust stream 109 and outlet a separated exhaust stream 111 that is provided downstream to a turbine section 115 of a turbomachine 117.

It will be appreciated that the fluid separator 101 of the present disclosure may be included in other fuel cell systems 100 (as well as other fluid systems) without departing from the scope of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell stack 104 may contain a plurality of fuel cells. Hydrogen may be supplied to the fuel cell stack 104 from a tank 106, and air may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Compressed air may be provided to the fuel cell stack 104, at least in part, by a compressor section 116 of the turbomachine 117. The compressor section 116 may compress an inlet airstream 127 into a compressed airstream 129 that is directed to the fuel cell stack 104 for boosting the operating efficiency of the fuel cell system 100.

In some embodiments, the turbomachine 117 may also include an e-machine, such as an electric motor 131. A common shaft may extend between the compressor section 116, the motor 131 and the turbine section 115. Accordingly, the shaft may be driven in rotation by the turbine section 115 and/or the motor 131, thereby rotatably driving a compressor wheel within the compressor section 116.

Various components of the fuel cell system 100 may be controlled by a control system 134. The control system 134 may be a computerized system with a processor, various sensors, and other components for electrically controlling operation of the fuel cell stack 104, the motor 131, and/or other features of the system 100. In some embodiments, the control system 134 may define or may be part of the electrical control unit (ECU) of a vehicle.

Figure 2:
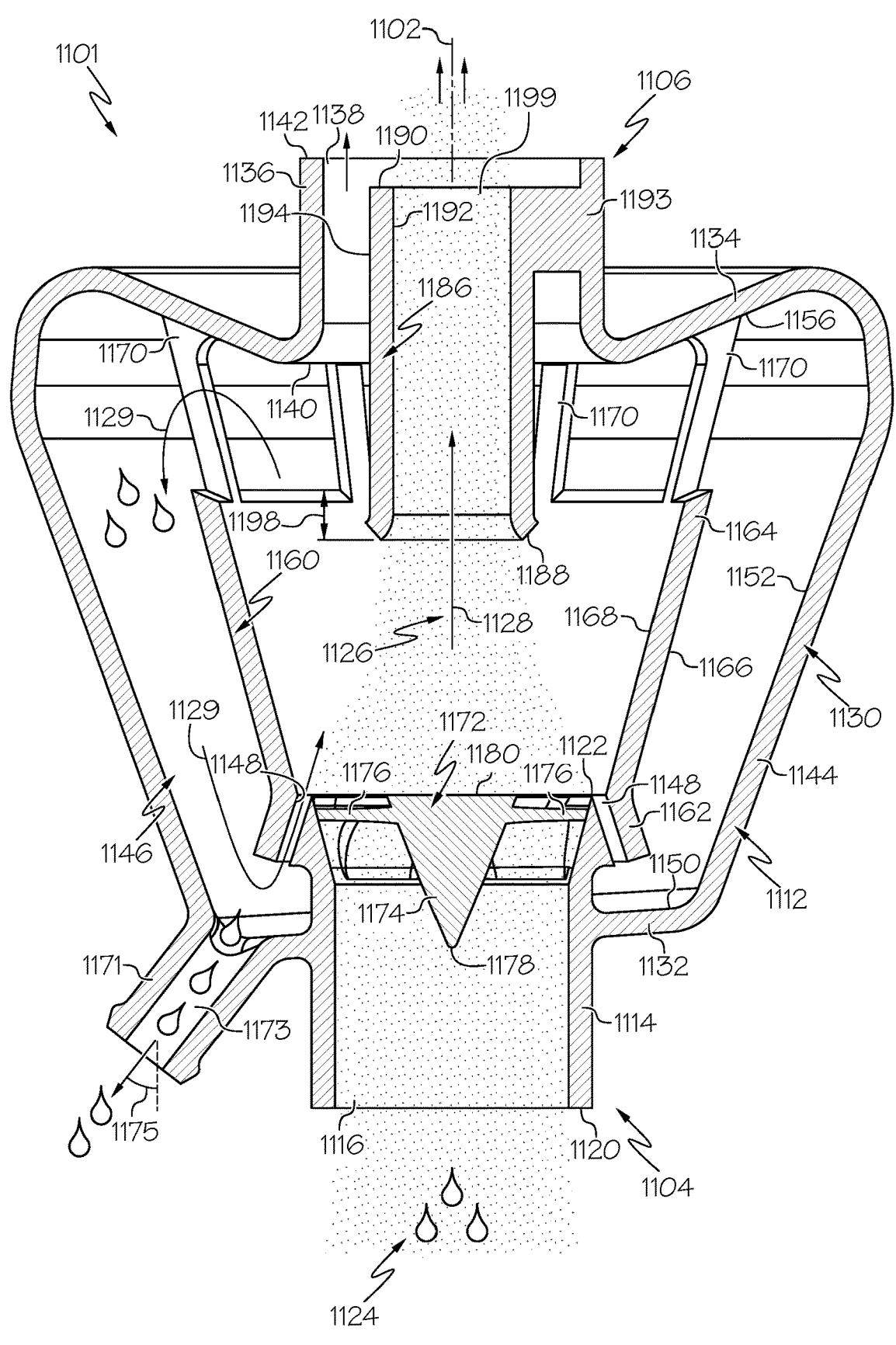
FIG. 2 is a longitudinal section view of the fluid separator device of FIG. 1 according to example embodiments of the present disclosure.

FIG. 2 illustrates a fluid separator 1101 in detail according to example embodiments of the present disclosure. The fluid separator 1101 may correspond to the separator 101 of FIG. 1 and may be incorporated into the fuel cell system 100 in some embodiments.

The fluid separator 1101 may define a straight longitudinal axis 1102 that extends between an inlet end 1104 and an outlet end 1106 of the separator 1101. In some embodiments, the fluid separator 1101 may be somewhat frusto-conic in shape and a majority of the fluid separator 1101 may include a plurality of walls 1112 with substantially consistent wall thicknesses. A number of the walls 1112 may be arcuate, contoured, and rounded about the axis 1102 in a circumferential direction. Also, a number of the walls 1112 may be substantially centered about the axis 1102. Flow through the fluid separator 1101 will be discussed in detail; however, flow through the fluid separator 1101 may be substantially in a downstream direction along the axis 1102 from the inlet end 1104 toward the outlet end 1106.

In some embodiments, the fluid separator 1101 may include an inlet member, such as an inlet tube 1114, which defines a fluid inlet 1116 (i.e., a fluid inlet passage) therethrough. The fluid inlet 1116 may have a circular cross-section taken normal to the axis 1102. The fluid inlet 1116 may be the sole fluid inlet into the fluid separator 1101. The fluid inlet 1116 may be centered about the axis 1102 at the inlet end 1104. The inlet tube 1114 may include an inlet lip 1120 and a downstream terminal end 1122, which are separated along the axis 1102. The inlet lip 1120 may be attached to a corresponding pipe, line, conduit, passage, etc. for fluidly connecting to the fuel cell stack 104 (FIG. 1) such that the fluid inlet 1116 receives a fluid mixture 1124 therefrom. The mixture 1124 may include a combination of water vapor, liquid water droplets, and gaseous air provided by the fuel cell stack 104 (FIG. 1).

The fluid separator 1101 may also include an outlet member, such as a first outlet tube 1136, which defines a first fluid outlet 1138 (i.e., a first fluid outlet passage) therethrough. The first fluid outlet 1138 may have a circular cross-section taken normal to the axis 1102. The first fluid outlet 1138 may be centered about the axis 1102 at the outlet end 1106. The first outlet tube 1136 may include an upstream end 1140 and a downstream terminal lip 1142, which are separated along the axis 1102. The downstream terminal lip 1142 may be attached to a corresponding pipe, line, conduit, passage, etc. for fluidly connecting to the turbine section 115 (FIG. 1). Also, as will be discussed, the fluid separator 1101 may be configured to separate and substantially remove the liquid water droplets from the fluid mixture 1124 such that air and, in some cases, water vapor is outlet from the separator 1101.

Furthermore, the fluid separator 1101 may include an outer wall member 1130. The outer wall member 1130 may be hollow and somewhat cylindrical with substantially constant wall thickness. The outer wall member 1130 may define a majority of an interior 1146 of the separator 1101. The outer wall member 1130 may generally include an inlet end wall 1132 disposed at the inlet end 1104. The inlet end wall 1132 may be attached to and may extend transverse from the inlet tube 1114, and the inlet tube 1114 may extend through the inlet end wall 1132 to fluidly connect the fluid inlet 1116 to the interior 1146. The outer wall member 1130 may further include an outlet end wall 1134 disposed proximate the outlet end 1106. The outlet end wall 1134 may be attached to and may extend transverse from the first outlet tube 1136, and the first fluid outlet 1138 may be fluidly connected to the interior 1146. Furthermore, the outer wall member 1130 may include an outer longitudinal wall 1144 extending between the inlet end wall 1132 and the outlet end wall 1134 substantially along the longitudinal axis.

The inlet end wall 1132 may include an inlet end wall surface 1150 that lies in a plane, and the plane may be angled with respect to the axis 1102. The outer longitudinal wall 1144 may include a longitudinal wall surface 1152 that faces the axis 1102, that extends circumferentially about the axis 1102, and that extends generally along the axis 1102. The longitudinal wall surface 1152 may gradually taper outward radially with respect to the longitudinal axis 1102 as the longitudinal wall surface 1152 extends along the longitudinal axis 1102 from the inlet end 1104 toward the outlet end 1106. In other words, the radius of the longitudinal wall surface 1152 may gradually increase as the longitudinal wall surface 1152 extends along the longitudinal axis 1102 from the inlet end 1104 toward the outlet end 1106 (i.e., from the inlet end wall 1132 to the outlet end wall 1134). The outlet end wall 1134 may include an outlet end wall surface 1156. The outlet end wall surface 1156 may face substantially along the axis 1102 in an upstream direction (i.e., toward the inlet end 1104). The outlet end wall surface 1156 may extend transverse to the axis 1102, from the first outlet tube 1136 to the longitudinal wall surface 1152 of the outer longitudinal wall 1144. The end wall surface 1156 may be tapered as it extends between the first outlet tube 1136 and the outer longitudinal wall 1144. The end wall surface 1156 may taper outward radially with respect to the axis 1102 as the end wall surface 1156 extends along the longitudinal axis 1102 away from the inlet end 1104 and toward the outlet end 1106. Thus, as shown in FIG. 2, the inlet end wall surface 1150, the longitudinal wall surface 1152, and the outlet end wall surface 1156 may cooperatively define the interior 1146 of the fluid separator 1101.

Furthermore, the fluid separator 1101 may include an inner flow member 1160. The inner flow member 1160 may be frusto-conic in shape and may include an upstream end 1162, a downstream end 1164, an outer surface 1166 facing away from the axis 1102, and an inner surface 1168 facing the axis 1102. The upstream end 1162 and the downstream end 1164 may have a circular cross-section taken perpendicular to the axis 1102. Also, the outer surface 1166 and the inner surface 1168 may be tapered. For example, for a majority of an axial length (along the axis 1102) of the inner flow member 1160, the outer surface 1166 and the inner surface 1168 may taper gradually outward radially as the inner flow member 1160 extends along the axis 1102 from the inlet end 1104 toward the outlet end 1106. The inner flow member 1160 may be supported (e.g., fixed) within the interior 1146 defined by the outer wall member 1130. For example, the fluid separator 1101 may include a plurality of brace members 1170 that extend from the downstream end 1164 of the inner flow member 1160 to the outlet end wall 1134 to support the inner flow member 1160. The upstream end 1162 may be attached to (e.g., received over and attached to) the downstream terminal end 1122 of the inlet tube 1114 to further support the inner flow member 1160 within the interior 1146.

Figure 6:
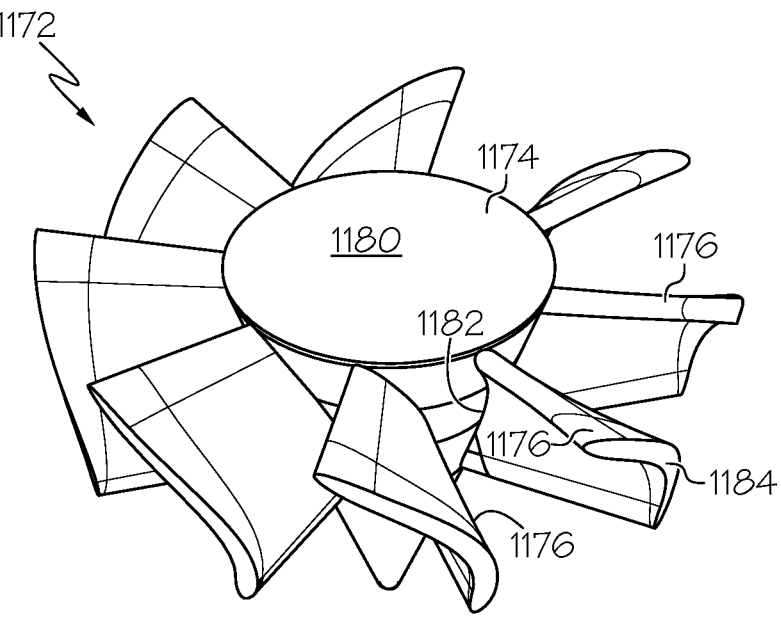
FIG. 6 is a perspective view of a swirl element of the fluid separator device of FIGS. 1-5 according to example embodiments.

The fluid separator 1101 may further include a swirler member 1172. As shown in FIG. 6, the swirler member 1172 may include a hub 1174 and a plurality of blades 1176 that radiate from the hub 1174 outward radially from the axis 1102. In some embodiments, the hub 1174 may be conic or frusto-conic in shape with an upstream end 1178 (FIG. 2) and a downstream end 1180, which are spaced apart along the axis 1102. The upstream end 1178 may be pointed in some embodiments, and the hub 1174 may flare outward radially toward the downstream end 1180. The downstream end 1180 may be circular and may be normal to the axis 1102. The blades 1176 may respectively include an inner radial end 1182, which is fixed to the hub 1174. The blades 1176 may extend radially outward from the inner radial end 1182 and may terminate at an outer radial end 1184 (FIG. 6). As shown in FIG. 2, the outer radial ends 1184 of the blades 1176 may be fixed to an opposing inner diameter surface of the terminal end 1122 of the inlet tube 1114. Accordingly, the fluid mixture 1124 inlet via the inlet tube 1114 may flow across the swirler member 1172.

The swirler member 1172 may be configured to at least partly direct flow of the mixture 1124 outward radially away from the axis 1102 as the mixture 1124 flows downstream along the axis 1102. As will be discussed, the swirler member 1172 may cause the mixture 1124 to swirl as it flows downstream. As a result, centrifugal forces may move the liquid droplets in the mixture 1124 outward radially as the mixture 1124 flows downstream through the separator 1101. The liquid droplets may separate somewhat from the water vapor and air within the flow of the mixture 1124. Accordingly, the swirler member 1172 imparts at least some separation of the parts of the mixture 1124 during operation.

Figure 7:
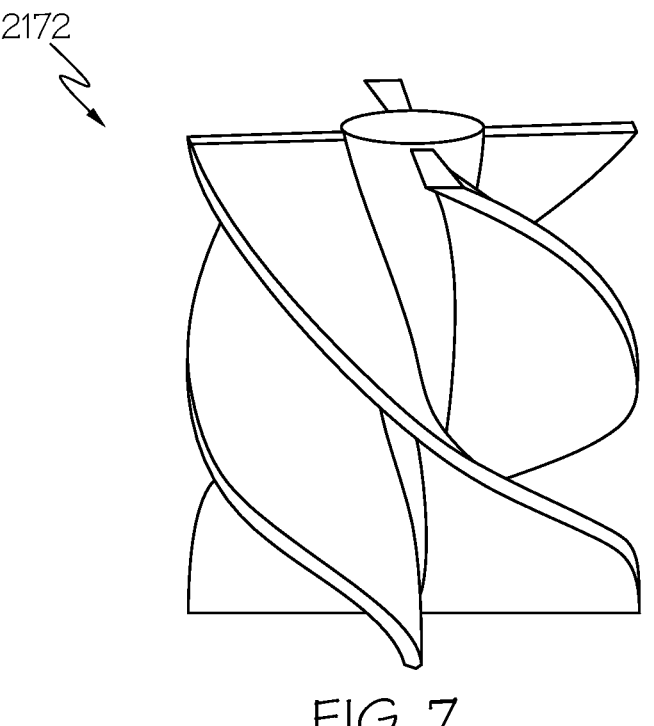
FIG. 7 is a perspective view of a swirl element of the fluid separator device of FIGS. 1-5 according to further example embodiments of the present disclosure.

The swirler member 1172 may include any suitable number of blades 1176. The blades 1176 may have a blade profile of any suitable type. In some embodiments, the blades 1176 may twist, extend helically about the axis 1102, bend about an axis that is normal to the axis 1102, and/or exhibit other blade profile characteristics. Also, the hub 1174 may have a variety of dimensions, surface profiles, and/or other characteristics without departing from the scope of the present disclosure. For example, additional embodiments of the swirler member 2172 are illustrated in FIG. 7. The swirler member 2172 may have a different number of blades, and the blades may have a different blade profile (i.e., different blade shape, different blade contour, different dimensions, etc.) than that of the swirler member 1172 of FIG. 6. In some embodiments, either the swirler member 1172 of FIG. 6 or the swirler member 2172 may be selected for use within the fluid separator 1101, depending on the flow characteristics of the mixture 1124 within the system. For example, if operation of the fuel cell system 100 causes the exhaust stream 109 to flow at lower velocities, lower mass flow rates, lower inlet pressures, then the swirler member 1172 of FIG. 6 may be selected for use in the separator 1101. In contrast, if the exhaust stream 109 flows at higher velocities, higher mass flow rates, higher inlet pressures, etc. then the swirler member 2172 of FIG. 7 may be selected for use in the separator 1101.

Referring back to FIG. 2, the fluid separator 1101 may further include an inner outlet pipe 1186. The inner outlet pipe 1186 may be hollow and cylindrical with a circular cross section taken perpendicular to the axis 1102. The inner outlet pipe 1186 may have a straight axis and may be centered about the axis 1102. The inner outlet pipe 1186 may include an upstream end 1188, a downstream end 1190, an inner radial surface 1192 that faces inward toward the axis 1102, and an outer radial surface 1194 that faces outward from the axis 1102. The radius of the inner outlet pipe 1186 may remain substantially constant along the axis 1102. The wall thickness of the inner outlet pipe 1186 may remain substantially constant along a majority of the axial length of the inner outlet pipe 1186. The upstream end 1188 may flare outward radially from the axis 1102 slightly. The inner outlet pipe 1186 may be fixedly attached to the first outlet tube 1136. For example, there may be one or more bridge supports 1193 that extend between the inner radial area of the first outlet tube 1136 and the outer radial area of the inner outlet pipe 1186. As such, inner outlet pipe 1186 may be co-axial and centered within the first outlet tube 1136. Also, the fluid inlet 1116, the first fluid outlet 1138, the second fluid outlet 1199, and the inner flow member 1160 may be co-axial and centered with respect to the longitudinal axis 1102. The downstream end 1190 of the inner outlet pipe 1186 may be received in the first fluid outlet 1138 of the first outlet tube 1136. Also, the upstream end 1188 may be disposed within the interior 1146 defined by the outer wall member 1130. More specifically, the upstream end 1188 may extend partially into the inner flow member 1160. Stated differently, the upstream end 1188 of the inner outlet pipe 1186 may be disposed further upstream along the axis 1102 at a distance 1198 than the downstream end 1164 of the inner flow member 1160. Accordingly, the inner outlet pipe 1186 may define a second fluid outlet 1199 from the interior 1146 of the fluid separator 1101. It will be appreciated that the second fluid outlet 1199 may provide a lower pressure outlet for one or more components of the mixture 1124. For example, the second fluid outlet 1199 may provide effective outlet for water vapor that has been separated from other parts of the flow as will be discussed.

The fluid separator 1101 may additionally include a drain 1171 that projects outwardly and at a positive angle 1175 from the axis 1102 and from the outer wall member 1130, proximate the inlet end 1104. A drain aperture 1173 may extend through the drain 1171 and through the outer wall member 1130 to fluidly communicate with the interior 1146. The drain aperture 1173 may fluidly connect at the transition between the inlet end wall 1132 and the outer longitudinal wall 1144. The inlet end wall 1132 may be angled toward the drain 1171 to direct liquid thereto. As will be discussed, the drain 1171 may be configured for draining liquid that has been separated from the fluid mixture 1124 and collected within the interior 1146.

Furthermore, the fluid separator 1101 may include one or more recirculation apertures 1148. There may be a number of recirculation apertures 1148 defined by gaps, holes, or other passages defined between the upstream end 1162 of the inner flow member 1160 and the downstream terminal end 1122 of the inlet tube 1114. There may be a plurality of recirculation apertures 1148 that are spaced about the axis 1102.

The fluid separator 1101 may, therefore, define and include a fluid flow path system 1126 within the interior 1146 that extends through the fluid separator 1101. The fluid mixture 1124 may enter as the exhaust stream 109 into the inlet end 1104, and the fluid mixture 1124 may contain air, gaseous water vapor, and liquid water droplets. The fluid separator 1101 may separate the liquid droplets from the air and gaseous water vapor. The separation may occur passively. The liquid droplets may be collected and drained from the separator 1101 via the drain 1171.

More specifically, the fluid flow path system 1126 may include a first flow path 1128 (i.e., an axial flow path) extending substantially along the longitudinal axis 1102 in a first downstream direction from the fluid inlet 1116, across the swirler member 1172, and through the inner flow member 1160 toward the first fluid outlet 1138 and the second fluid outlet 1199.

Also, the fluid flow path system 1126 may include one or more second flow paths, such as the second flow path 1129 indicated in FIG. 2. As shown, the second flow path 1129 may be defined between the outer wall member 1130 and the inner flow member 1160. The second flow path 1129 may be defined radially between the outer wall member 1130 and the inner flow member 1160. The second flow path 1129 may also be defined axially (e.g., at one end) between the outer wall member 1130 and the inner flow member 1160. Also, the second flow path 1129 may be defined partly by the recirculation aperture(s) 1148. More specifically, the axial gap between the downstream end 1164 and the outlet end wall surface 1156 may define an upstream portion of the second flow path 1129, where fluid flow branches away from the first flow path and the outlet end wall surface 1156 redirects flow back axially in a direction opposite the first flow path 1128. The longitudinal wall surface 1152 and the outer surface 1166 may define the second flow path 1129 further downstream and may direct flow longitudinally generally from the outlet end 1106 and toward the inlet end 1104. The inlet end wall surface 1150 may further define the second flow path 1129 further downstream and may redirect flow back axially toward the recirculation apertures 1148. The recirculation apertures 1148 may fluidly connect the second flow path 1129 to the first flow path 1128. Thus, flow through the recirculation apertures 1148 may rejoin the axial flow path 1128. In some embodiments, the recirculation apertures 1148 may fluidly connect to the axial flow path 1128 at an axial position that is at or slightly downstream relative to the end 1180 of the swirler member 1172.

In addition, the drain aperture 1173 may branch from the recirculation flow path 1129. As such, the drain 1171 may define a liquid flow path as will be described.

During operation of the fuel cell system 100 (FIG. 1), the fluid mixture 1124 may enter the separator 1101 via the inlet 1116. The fluid mixture 1124 may contain liquid water droplets (indicated by droplet symbols in FIG. 2), gaseous water vapor (as indicated by smaller dots in FIG. 2), and gaseous air that flows therewith. The swirler member 1172 may swirl the flow causing the liquid droplets to move outward radially away from the axis 1102 as the mixture 1124 flows further downstream along the first flow path 1128. Air and the liquid water may be diverted outward radially from the first flow path 1128 and into the second flow path 1129 as shown in FIG. 2. This liquid water may drain from the drain apertures 1173, and the air in the second flow path 1129 may rejoin the first flow path 1128. Additionally, the gaseous water vapor in the mixture 1124 that enters the separator 1101 may flow across the swirler member 1172. The second fluid outlet 1199 may define a lower pressure area of the outlet end 1106 that efficiently draws the gaseous water vapor out of the separator 1101. The first fluid outlet 1138 may also provide an outlet from the first flow path 1128. Thus, air in the mixture 1124 may flow directly from the inlet 1116 to the first and/or second fluid outlets 1138, 1199, and air in the mixture 1124 may also branch away from the first flow path 1128 and recirculate back thereto via the second flow path 1129.

Figure 3:
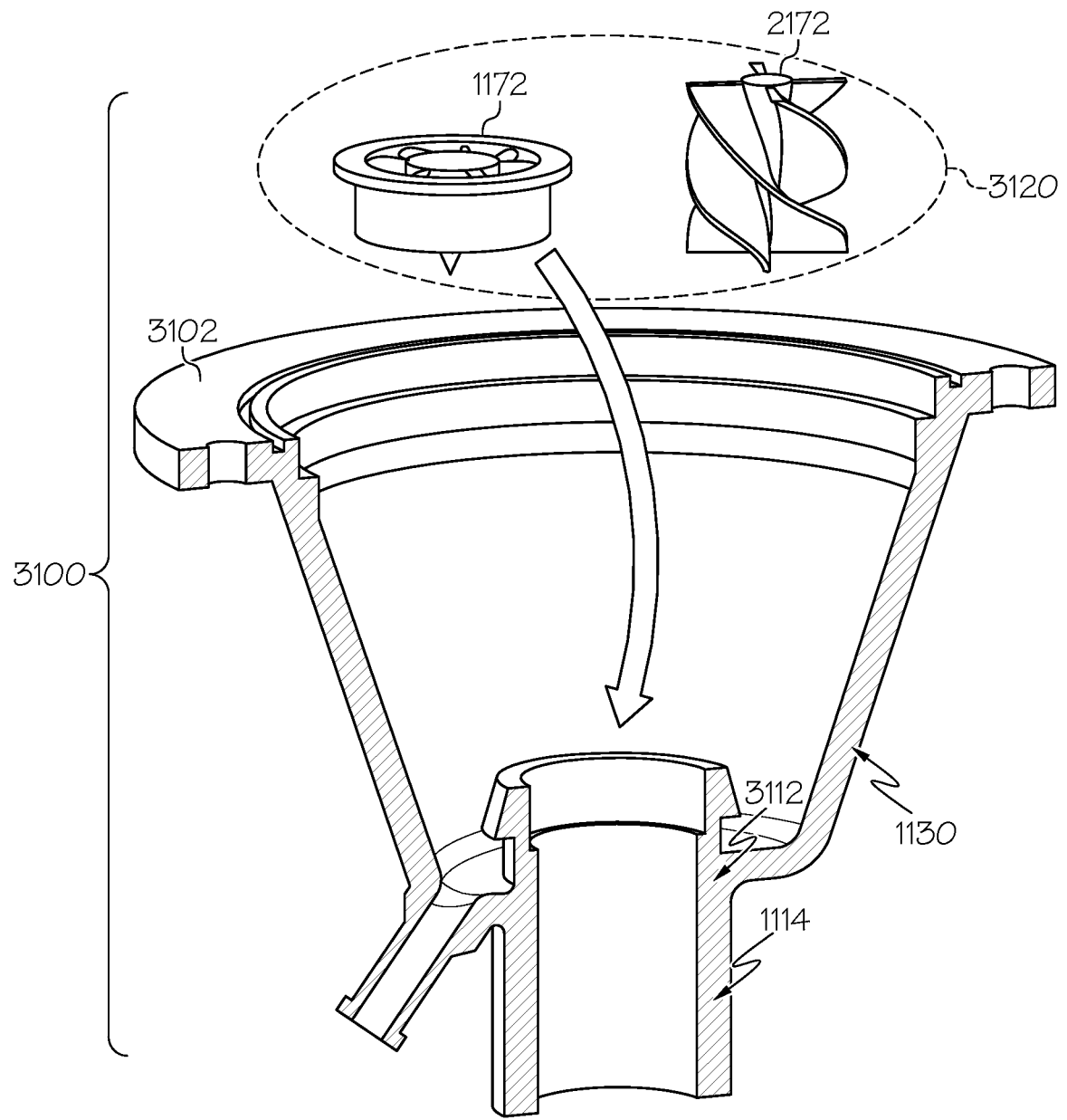
FIG. 3 is an exploded, perspective, and partially cross-sectional view of a plurality of first features of the fluid separator device of FIGS. 1 and 2, which are shown to illustrate a method of manufacture of the fluid separator device according to example embodiments.
Figure 4:
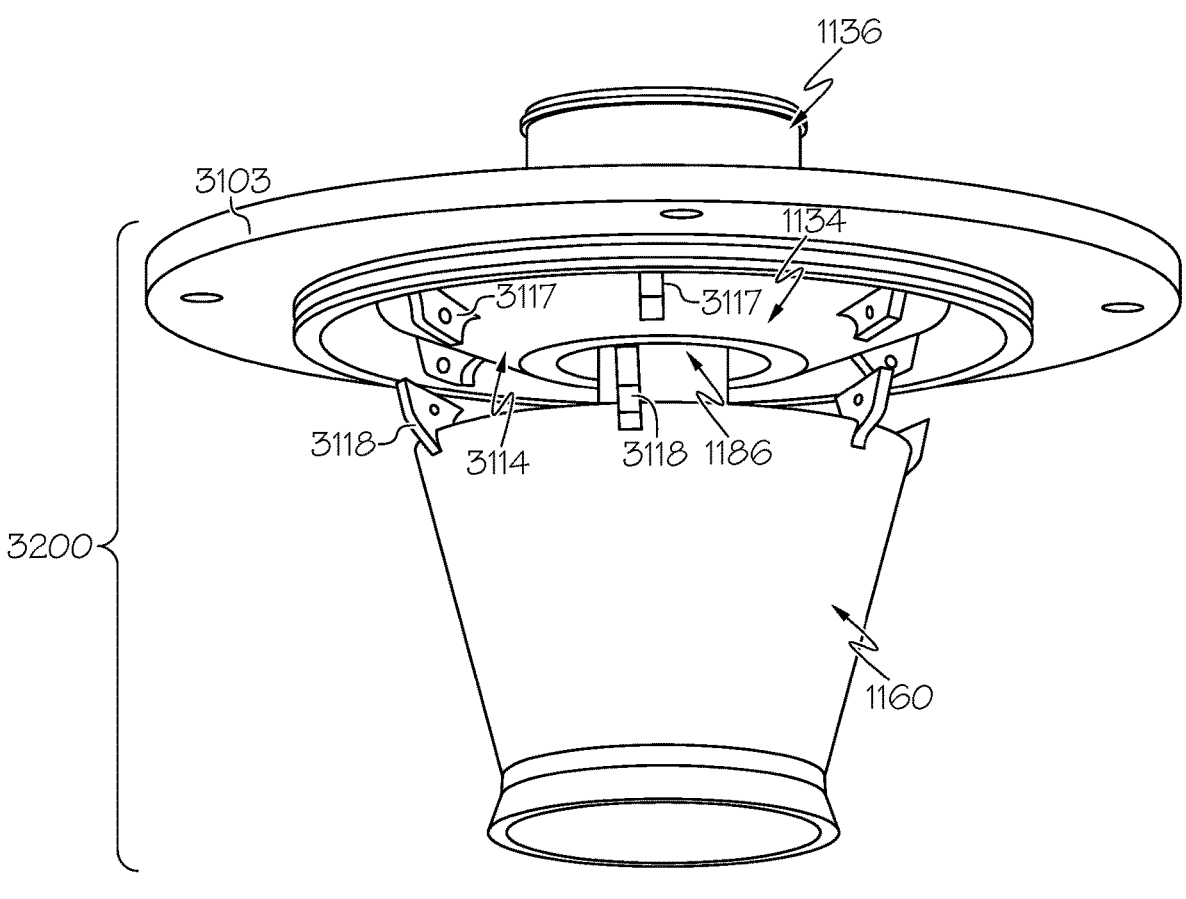
FIG. 4 is an exploded perspective view of a plurality of second features of the fluid separator device of FIGS. 1 and 2, which are shown to further illustrate the method of manufacture of the fluid separator device according to example embodiments.
Figure 5:
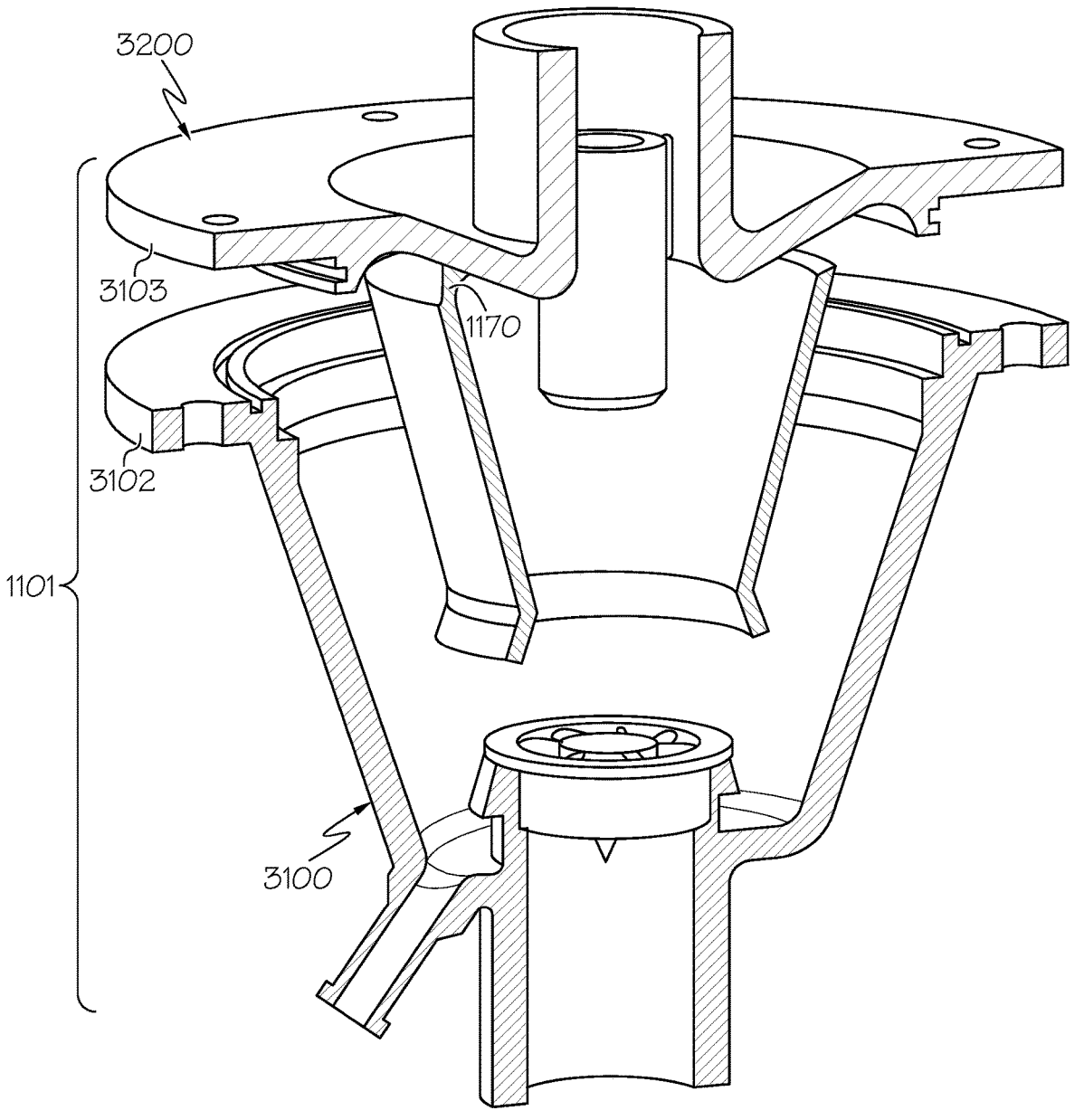
FIG. 5 is an exploded, perspective, and partially cross-sectional view of the plurality of first and second features of the fluid separator device of FIGS. 1 and 2, which are shown to further illustrate the method of manufacture of the fluid separator device according to example embodiments.

FIGS. 3-5 illustrate methods of manufacturing the separator 1101 according to example embodiments. As will be discussed, the separator 1101 may include features that increase modularity and/or allow the separator 1101 to be tailored to a specific system 100. For example, the separator 1101 may be assembled from distinct parts/sections in an efficient and modifiable manner.

In some embodiments, one or more portions of the separator 1101 may be made from or contain a polymeric or composite material. For example, the separator 1101 may be made from a fiberglass reinforced polyamide resin in some embodiments. Furthermore, in some embodiments, the separator 1101 may be molded in some embodiments (e.g., formed via plastic injection molding). However, it will be appreciated that the separator 1101 may be formed otherwise without departing from the scope of the present disclosure.

As shown in FIG. 3, inlet tube 1114 and outer wall member 1130 may be provided together (e.g., plastic injection molded) as a unitary, one-piece inlet part 3112. In some embodiments, a first outlet end lip 3102 may be included for use in further assembly as will be discussed. Also, the swirler member may be selectively chosen, for example, from a group 3120 consisting of at least the swirler member 1172 of FIG. 6 and the swirler member 2172 of FIG. 7. As an example, the swirler member 1172 of FIG. 6 may be selected and attached to the inlet tube 1114 to form an inlet end subassembly 3100.

As mentioned above, the swirler member 1172 may be selected over the swirler member 2172, for example, based on the flow velocity, inlet pressure, mass flow rate, and/or other operating condition that is expected during use. It will be appreciated that dimensions of the part 3112 may also be varied and selected for use in a similar fashion.

Additionally, as shown in FIG. 4, the outlet end wall 1134, the first outlet tube 1136, and the inner outlet pipe 1186 may be provided together (e.g., plastic injection molded) as a unitary, one-piece outlet part 3114. In some embodiments, a second outlet end lip 3103 may be included for use in further assembly as well be discussed. Also, the outlet part 3114 may include one or more tabs 3117 included thereon. The inner flow member 1160 may also be formed (e.g., plastic injection molded) to include corresponding tabs 3118 as shown. The pairs of tabs 3117, 3118 may be connected together (e.g., via fasteners, adhesives, etc.) to attach the inner flow member 1160 to the outlet part 3114 and to define the brace members 1170 described above. Accordingly, the attached outlet part 3114 and inner flow member 1160 may cooperatively define an outlet end subassembly 3200.

Subsequently, as shown in FIG. 5, the inlet end subassembly 3100 and the outlet end subassembly 3200 may be joined together to define the separator 1101. For example, the first outlet end lip 3102 may be joined to the second outlet end lip 3103 (e.g., via fasteners, adhesives, etc.).

Accordingly, the separator 1101 may separate and remove liquid water from the exhaust stream 109 (FIG. 1), and water vapor and air may be provided as the separated exhaust stream 111 to the turbine section 115 of the turbomachine 117. There may be a relatively low pressure drop (i.e., a low pressure gradient) across the separator 1101 from the inlet end 1104 to the outlet end 1106. Thus, the separator 1101 may provide efficient fluid flow across a wide range of operating conditions such that the system 100 operates at high efficiency. Also, the separator 1101 may be compact and lightweight. The separator 1101 may be manufactured efficiently with relatively few parts as well.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A fluid separator device configured for separating a part of a fluid mixture from another part of the fluid mixture, the fluid separator device comprising:

an outer wall member that defines an interior of the fluid separator device, the interior defining a longitudinal axis of the fluid separator device;

an inlet end that defines a fluid inlet that is fluidly connected to the interior and that is configured to receive the fluid mixture;

an outlet end separated at a distance from the inlet end along the longitudinal axis, the outlet end defining a first fluid outlet from the interior, the longitudinal axis extending through the first fluid outlet;

an outlet pipe that is supported within the interior and within the first fluid outlet, the outlet pipe defining a second fluid outlet from the interior;

an inner flow member that is supported within the interior;

a fluid flow path system defined within the interior, the fluid flow path system including:

a first flow path extending in a first downstream direction from the fluid inlet and through the inner flow member toward at least one of the first fluid outlet and the second fluid outlet; and a second flow path that is at least partly defined between the outer wall member and the inner flow member, the second flow path extending in a second downstream direction from the outlet end toward the inlet end, the second flow path configured to receive flow from the first flow path.

2. The fluid separator device of claim 1, further comprising a swirler member supported within the first flow path and configured to at least partly direct the first flow path outward radially from the longitudinal axis.

3. The fluid separator device of claim 2, further comprising a recirculation aperture extending through the inner flow member, the recirculation aperture fluidly connecting the second flow path to the first flow path and configured to recirculate flow from the second flow path to the first flow path.

4. The fluid separator device of claim 3, wherein the swirler member includes an upstream end, a downstream end, and a plurality of blades that radiate about the longitudinal axis; and wherein the recirculation aperture is fluidly connected to the first flow path at the downstream end of the swirler member.

5. The fluid separator device of claim 4, further comprising a drain aperture extending through the outer wall member that is fluidly connected to the second flow path and configured for draining a liquid component of the fluid mixture from the fluid separator device.

6. The fluid separator of claim 1, wherein the outer wall member includes an inner surface that at least partly defines the interior, the inner surface being tapered outward radially with respect to the longitudinal axis as the inner surface extends along the longitudinal axis from the inlet end toward the outlet end.

7. The fluid separator of claim 6, wherein the inner flow member includes an outer surface that is tapered outward radially with respect to the longitudinal axis as the outer surface extends along the longitudinal axis from the inlet end toward the outlet end.

8. The fluid separator of claim 1, wherein the inner flow member includes an inner surface that is tapered outward radially with respect to the longitudinal axis as the inner surface extends along the longitudinal axis from the inlet end toward the outlet end.

9. The fluid separator of claim 8, wherein the outlet pipe extends partially into the inner flow member.

10. The fluid separator of claim 1, wherein the outer wall member includes an inlet end wall surface proximate the inlet end and extending transverse to the longitudinal axis, an outlet end wall surface proximate the outlet end and extending transverse to the longitudinal axis, and a longitudinal wall surface extending between the inlet end wall surface and the outlet end wall surface along the longitudinal axis; and wherein the inlet end wall surface, the outlet end wall surface, and the longitudinal wall surface cooperatively define the interior.

11. The fluid separator of claim 10, wherein the outlet end wall surface is tapered outward radially with respect to the axis as the outlet end wall surface extends along the longitudinal axis away from the inlet end and toward the outlet end.

12. The fluid separator of claim 1, wherein the first fluid outlet and the second fluid outlet are co-axial and centered with respect to the longitudinal axis.

13. The fluid separator of claim 12, wherein the longitudinal axis is straight, and wherein the fluid inlet, the first fluid outlet, and the second fluid outlet are co-axial and centered with respect to the longitudinal axis.

14. The fluid separator of claim 13, wherein the fluid inlet, the first fluid outlet, the second fluid outlet, the inner flow member and the outer wall member are co-axial and centered with respect to the longitudinal axis.

15. A method of manufacturing a fluid separator device that is configured for separating a part of a fluid mixture from another part of the fluid mixture, the method comprising:

providing an outer wall member that defines an interior of the fluid separator device, the interior defining a longitudinal axis of the fluid separator device;

providing an inlet end that defines a fluid inlet that is fluidly connected to the interior and that is configured to receive the fluid mixture;

providing an outlet end separated at a distance from the inlet end along the longitudinal axis, the outlet end defining a first fluid outlet from the interior, the longitudinal axis extending through the first fluid outlet;

supporting an outlet pipe within the interior and within the first fluid outlet, the outlet pipe defining a second fluid outlet from the interior;

supporting an inner flow member within the interior;

defining a fluid flow path system within the interior, the fluid flow path system including:

a first flow path extending in a first downstream direction from the fluid inlet and through the inner flow member toward at least one of the first fluid outlet and the second fluid outlet; and a second flow path that is at least partly defined between the outer wall member and the inner flow member, the second flow path extending in a second downstream direction from the outlet end toward the inlet end, the second flow path configured to receive flow from the first flow path.

16. The method of claim 15, further comprising supporting a swirler member within the first flow path and configured to at least partly direct the first flow path outward radially from the longitudinal axis.

17. The method of claim 16, further comprising selecting the swirler member from a group consisting of a first swirler member and a second swirler, the second swirler having a different blade profile from that of the first swirler member.

18. The method of claim 16, further comprising providing the outer wall member and the inlet end as a unitary, one-piece part and attaching the swirler member to the unitary, one-piece part to form a first subassembly of the fluid separator device.

19. The method of claim 18, further comprising providing the outlet end and the outlet pipe together as another unitary, one-piece part and attaching the inner flow member to the other unitary, one-piece part to form a second subassembly of the fluid separator device; and further comprising attaching the first subassembly to the second subassembly.

20. A fuel cell system comprising:

a fuel cell stack;

a turbomachine with a turbine section; and a fluid separator device fluidly connected to the fuel cell stack and configured to receive a fluid mixture from the fuel cell stack, the fluid separator device fluidly connected upstream to the turbine section, the fluid separator device configured for separating a part of the fluid mixture from another part of the fluid mixture to provide a separated exhaust stream from the fuel cell stack to the turbine section, the fluid separator device comprising:

an outer wall member that defines an interior of the fluid separator device, the interior defining a longitudinal axis of the fluid separator device;

an inlet end that defines a fluid inlet that is fluidly connected to the interior and that is configured to receive the fluid mixture;

an outlet end separated at a distance from the inlet end along the longitudinal axis, the outlet end defining a first fluid outlet from the interior, the longitudinal axis extending through the first fluid outlet;

an outlet pipe that is supported within the interior and within the first fluid outlet, the outlet pipe defining a second fluid outlet from the interior;

an inner flow member that is supported within the interior; and a fluid flow path system defined within the interior, the fluid flow path system including:

a first flow path extending in a first downstream direction from the fluid inlet and through the inner flow member toward at least one of the first fluid outlet and the second fluid outlet; and a second flow path that is at least partly defined between the outer wall member and the inner flow member, the second flow path extending in a second downstream direction from the outlet end toward the inlet end, the second flow path configured to receive flow from the first flow path.

* * * * *